United States Patent [19]

Danner et al.

[11] 3,953,584

[45] Apr. 27, 1976

[54] PROCESS FOR THE PREPARATION OF BASIC ALUMINUM CHLORIDES

[75] Inventors: Max Danner; Martin Krieg, both of Gersthofen, Germany

[73] Assignee: Hoechst Aktiengesellschaft, Frankfurt am Main, Germany

[22] Filed: Feb. 21, 1974

[21] Appl. No.: 444,539

[30] Foreign Application Priority Data

Feb. 27, 1973  Germany............................ 2309610

[52] U.S. Cl................................. 423/462; 423/495; 204/94
[51] Int. Cl.$^2$........................................... C01F 7/56
[58] Field of Search ............ 423/462, 495, 111, 122

[56] References Cited
UNITED STATES PATENTS

| | | | |
|---|---|---|---|
| 3,544,476 | 12/1970 | Aiba et al. ...................... | 423/495 X |
| 3,655,329 | 4/1972 | Shih et al. ........................... | 423/395 |
| 3,816,605 | 6/1974 | Belsky............................. | 423/495 X |
| 3,894,144 | 7/1975 | Becher et al................... | 423/462 X |

FOREIGN PATENTS OR APPLICATIONS

| | | | |
|---|---|---|---|
| 1,226,043 | 7/1960 | France................................ | 423/495 |
| 36-24055 | 12/1961 | Japan.................................. | 423/462 |

OTHER PUBLICATIONS

J. W. Mellor's "A Comprehensive Treatise on Inorganic and Theoretical Chemistry," Vol. 5, 1924, p. 318, Longmans, Green & Co., N. Y.

*Primary Examiner*—Edward Stern
*Attorney, Agent, or Firm*—Connolly and Hutz

[57] ABSTRACT

For the preparation of basic aluminum chlorides by reaction of $AlCl_3$ with aluminum hydroxides, there are generally used aluminum hydroxides easily soluble in mineral acids. According to the process of the invention, however, also such aluminum hydroxides which are soluble in mineral acids only at temperatures above 80°C and which moreover are very cheap may be used when they are reacted with aluminum chloride hexahydrate suspensions at a temperature of from 110° to 150°C.

5 Claims, No Drawings

PROCESS FOR THE PREPARATION OF BASIC ALUMINUM CHLORIDES

The present invention relates to a process for the preparation of basic aluminum chlorides.

Basic aluminum chlorides become increasingly important in the industry of cosmetics, pharmaceutics and textiles, per se as well as in various formulations as anti-perspirants or tanning agents, and additionally, they are used in a less pure form in the manufacture of flameproof shaped articles. Recently, aluminum oxides have been synthesized from basic aluminum chlorides, which oxides, because of their special properties, are used as catalysts (German Offenlegungsschrift No. 2,048,434). Furthermore, sulfate containing basic aluminum chlorides are also known, which are recommended for the purification of water (German Offenlegungsschrift No. 2,107,970).

Numerous processes for the preparation of such halides are known, which processes may be classified as belonging to one of three main groups. The first of these groups comprises processes with start from metallic aluminum in the form of chips, gravel or plates. In case of using the latter ones, they must for example be dissolved in hydrochloric acid by electrochemical methods according to the process of German Pat. No. 1,174,751. In another process, aluminum chips are continuously reacted with hydrochloric acid (German Offenlegungsschrift No. 2,048,273). The disadvantage of all these processes resides in the fact that the raw materials are relatively expensive.

The process of the second group use cheaper raw materials, namely aluminum compounds obtained from oxides. They are based on the principle of obtaining basic aluminum halides by a double reaction of other basic aluminum salts, for example basic aluminum sulfide (obtainable, however, only in several steps). Basic aluminum halides are also obtainable by ion exchange. It has also been proposed to convert anhydrous aluminum chloride to basic aluminum chlorides by partial hydrolysis (see German Offenlegungsschrift No. 1,567,470). However, all these processes are relatively complicated and therefore not very economic.

The processes of the third group start from the cheapest aluminum raw materials, namely aluminum hydroxides or aluminum oxide hydrates or aluminum oxides, but because of their poor solubility in mineral acids, these substances cannot be converted directly to basic aluminum chlorides; they have to be converted first to reactive aluminum hydroxides by degradation, reprecipitation etc., which hydroxides subsequently react with hydrochloric acid or aluminum chloride solutions. The first process step, that is, the preparation of freshly precipitated aluminum hydroxides, requires great expenditure with respect to apparatus and does not always supply compounds of sufficient purity, since impurities occur in the further reaction, which impurities either cannot be removed at all or must be eliminated quantitatively with great expenditure. Although such aluminum hydroxides, aluminum oxide hydrates and aluminum oxides which may be converted to basic aluminum chlorides by reaction even with dilute hydrochloric acid are available on the market, their price is at such a level that their use is even more unprofitable than that of metallic aluminum.

It is the object of the present invention to provide a process for the preparation of basic aluminum chlorides wherein the cheapest raw materials, that is, aluminum hydroxides or aluminum oxide hydrates, known hitherto as not being apt for direct processing, are used as starting substances, which substances are subsequently converted to the desired basic salts without complicated intermediate process steps, for example reprecipitation.

Subject of this invention is therefore a process for the preparation of basic aluminum chlorides of the formula $Al_2(OH)_nCl_z$, where $0<n<4$ and $6>z>2$; $n + z$ being always 6, which comprises preparing $AlCl_3.6H_2O$ suspensions in a first step from 36–55 weight % hydrochloric acid and the equimolar amount of an aluminum hydroxide, for example of the kind which is soluble in mineral acids only at a temperature above 80° C and within a technically acceptable period, subsequently reacting these suspensions with an excess of an aluminum hydroxide, soluble in mineral acids only at a temperature above 80° C and within technically acceptable periods, ranging from 5 to 50 weight % above the amount required for obtaining the desired basic aluminum chloride, at a temperature of from 100° to 150° C, preferably from 110° to 150° C, until the required stoichiometric composition is formed, subsequently stirring the reaction mixture with water, separating non-converted aluminum hydroxide and finally working up or processing the resulting solution in known manner.

It is a surprising fact which was not to be expected that, while according to German Offenlegungsschrift No. 2,048,434 ball-shaped aluminum oxides of finest distribution (grain size from 3 to 5 microns) which cannot be filtered any more precipitate when aqueous solutions of basic aluminum chlorides in an atomic ratio of Al:Cl of from 0.5 : 1 to 1.5 : 1 are heated, according to the process of the invention, that is, reaction within a determined chloride concentration range, there are obtained completely stable basic aluminum chloride which do not disintegrate any more.

By aluminum hydroxides which may be used for the process of the invention, there are to be understood those substances which dissolve in mineral acids, preferably hydrochloric acid, only at a temperature above 80° C and within technically acceptable periods, yielding $AlCl_3 \cdot 6 H_2O$ suspensions. Suitable substances of this kind are for example aluminum oxide Bayer, bayerite, gibbsite, hydrargillite, diaspore, boehmite or bauxite. Of course, $AlCl_3 \cdot 6 H_2O$ suspensions may be obtained also by reaction of those non-altered aluminum hydroxides which are easily soluble in concentrated hydrochloric acid below 80° C (for example at 20°) already or even in dilute hydrochloric acid; but the use of these products is unprofitable. The $Al_2O_3$ content of such substances is generally from about 50 to 70 weight % and may also be superior or inferior. Advantageously, products are used the grain spectrum of which shows approximately the following size distribution: about 30% smaller and about 70% larger than 60 microns. When products containing a larger amount of fine grains, for example 40% smaller than 40 microns, are used, reaction mixtures are obtained in the second reaction step which are of a high viscosity and therefore stirred with more difficulty.

As compared to the state of the art, according to which basic aluminum chloride solutions can be obtained only from determined aluminum hydroxides or aluminum oxides easily soluble in mineral acid, the first step of the process of the invention is different in that the $AlCl_3 \cdot 6 H_2O$ suspension is prepared either from 36 to 55 weight %, preferably 40 to 45 weight % hydrochloric acid and the equimolar amount of aluminum hydroxide by heating to 80°–120° C, preferably about 110° C; or from hydrochloric acid of lower HCl concentration and aluminum hydroxide with additional introduction of gaseous hydrogen chloride at the temperatures as indicated, until the above concentration is attained; or from an aqueous aluminum hydroxide suspension, into which, at the above temperatures, gaseous hydrogen chloride is introduced until a final concentration corresponding to 36–55 weight % is attained. Preferably, the operations are carried out in a closed system until complete conversion, which generally takes from 4 to 6 hours.

The important factor for the suspension obtained in the one or the other manner is the chloride concentration, which is required to be from 278 to 385, preferably from 303 to 332 mg of chloride per g of suspension. Higher chloride concentrations may be adjusted in principle, but there are certain limits set by the technological conditions, for example the possibility of sufficiently intermixing a batch of higher concentration and thus of higher viscosity.

The control factor for the quantitative conversion of the starting components is the solubility of a sample of the reaction mixture in water in a transparent form. It is very important for the $AlCl_3·6H_2O$ suspension to be of this nature, in order to prevent disturbances in the subsequent reaction step on account of thermal hydrolysis of the basic aluminum chlorides formed which would cause precipitation of aluminum oxide in finest particles impossible to separate after complete reaction.

In the second process step, the $AlCl_3·6H_2O$ suspension is reacted with further aluminum hydroxide of the same quality to form the basic chlorides by heating the suspension to a temperature of from 110° to 150° C, preferably from about 120° C to 130° C, with an amount of aluminum hydroxide which is by 5 to 50%, preferably 20 to 40%, superior to the amount necessary to obtain the basic salt of the desired composition. Subsequently, the reaction mixture is maintained at the indicated temperature. In order to avoid local overheating which would cause decomposition of the basic aluminum chlorides being formed, a thorough intermixing is required. The reaction is continued until a sample of the mixture, diluted with water and filtered off from undissolved aluminum hydroxide, shows the desired atomic ratio of Al:Cl. Depending on the final ratio of Al:Cl required, a reaction time of from about 10 to 50 hours is necessary.

The reaction mixture is now stirred with cold water, preferably the 1- to 5-fold volume, thus causing precipitation of the non-reacted aluminum hydroxide, which is separated by filtration, centrifugation or decanting and may be reused in the first process step of the subsequent batch, so that finally the basic aluminum chlorides are obtained with a practically 100% yield relative to the aluminum hydroxide employed.

The solutions of basic aluminum chlorides so obtained may be worked up to form solid products according to known processes, for example spray drying or evaporation. The solutions may also be processed according to the method described in German Patent No. 1,174,751, that is, by electrolysis between aluminum plates, to form solutions of polybasic aluminum chlorides, which may simultaneously result in a qualitative improvement, because colored impurities possibly contained in the solutions are cathodally reduced.

The process of the invention, according to which basic aluminum chlorides of the formula $Al_2(OH)_nCl_z$, where $n$ is greater than 0 and smaller than 4; $z$ smaller than 6 and greater than 2; $n + z$ being always 6, are obtained, is distinguished by its special profitability. As compared to processes starting from aluminum metal and hydrochloric acid, it offers also an easier operation, since the first step, that is, formation of $AlCl_3·6H_2O$ from aluminum hydroxide and hydrochloric acid, proceeds much gentler and better controllable than the reaction of aluminum metal with hydrochloric acid, which is very violent at the start. Furthermore, because of the extreme concentration ratios in relatively small apparatus, high throughput rates are attained. It is a special advantage of the process in accordance with this invention that also relatively basic aluminum chlorides of the formula $Al_2(OH)_nCl_{6-n}$, where $n$ is greater than 3, especially $4 > n > 3.5$, may be prepared.

According to the operation mode described, also basic aluminum salts of hydrobromic acid may be obtained with the same results.

The following examples illustrate the invention.

EXAMPLE 1

1.014 g (10 moles of HCl) of 36 weight % hydrochloric acid are introduced into a glass apparatus provided with reflux condenser and agitator, and 350 g [4.5 moles of $Al(OH)_3$] of aluminum hydroxide containing 65 weight % of $Al_2O_3$ are added. The mixture is heated slowly to 80° C with agitation, causing part of the aluminum hydroxide to be dissolved in a weakly exothermal reaction. Subsequently, 123 g (3.38 moles) of hydrogen chloride are fed in, thus corresponding to a total theoretical HCl concentration of 42.9%. In order to completely convert the aluminum hydroxide, the suspension is heated to boiling temperature (about 110° C) for about 3 hours. A sample of the reaction mixture then dissolves in water in a transparent form. The suspension now contains an aluminum compound having an atomic ratio of Al:Cl = 0.33:1 and a concentration of 319 mg of $Cl^-$/g of suspension. 717 g (9.15 moles) of aluminum hydroxide of the same quality are now stirred into this suspension. The whole is heated to 120° C with agitation, and the temperature is maintained for 45 hours. The atomic ratio of Al:Cl = 0.85:1 of the dissolved salt is determined from a sample of the mixture diluted with water and filtered off the non-converted course-grained aluminum hydroxide in transparent form. This ratio corresponds to a basic aluminum chloride of the formula $Al_1(OH)_{1.82}Cl_{1.18}$. For the work-up, the content of the flask is stirred with about 1 kg of cold water, and the non-converted aluminum hydroxide is separated by suction-filtration and washed once with a small amount of cold water in order to liberate it from chloride ions.

Yield: 2044 g of transparent solution.

The non-converted aluminum hydroxide weighing 207 g (wet), containing 186 g of $Al(OH)_3$ (2.4 moles) may be reused in the subsequent batch for the preparation of the $AlCl_3·6H_2O$ suspension.

EXAMPLE 2 (COMPARATIVE EXAMPLE)

1014 g of 30% hydrochloric acid (8.34 moles of HCl) are introduced into the apparatus described in Example 1. 218 g of aluminum hydroxide containing 65% of $Al_2O_3$ [2.78 moles of $Al(OH)_3$] are added, and the whole is slowly heated to 80° C with agitation. When the main amount of aluminum hydroxide is reacted, the batch is maintained at 105° C until a sample of the reaction mixture dissolves in water in a practically transparent form. The solution contains an aluminum compound having an atomic ratio of Al:Cl = 0.33:1. The chloride concentration is 240 mg of Cl⁻/g of $AlCl_3·6H_2O$ suspension.

509 g [6.49 moles of $Al(OH)_3$] of the above aluminum hydroxide are stirred into this suspension, the reaction mixture then being heated to 120° C and maintained at this temperature for 40 hours. The result is a basic aluminum chloride having an atomic ratio of Al:Cl = 0.59:1; but the mixture, bexides non-converted aluminum hydroxide, contains finest particles formed by hydrolytic disintegration of the basic aluminum chloride, so that a sample, diluted with $H_2O$, cannot be obtained in a transparent form by filtration.

When stirring of the reaction mixture at 120° C is continued, the atomic ratio of Al:Cl in the solution decreases continuously, and the amount of finest particles increases accordingly. 1 kg of water is stirred in for a work-up of the reaction mixture (1 740 g). The suspension obtained cannot be filtered because of the amount of finest grains.

EXAMPLE 3

528.8 kg of 36% hydrochloric acid (5.22 K-moles of HCl; 1 K-mole being 1000 moles) are introduced into an enamelled vessel with agitator having a capacity of 2 m³. 159 kg of aluminum hydroxide containing 65% of $Al_2O_3$ [2.02 K-moles of $Al(OH)_3$] afe added with agitation; the temperature slowly rising to 50°–70° C on account of the slightly exothermal reaction. In order to increase the hydrogen chloride concentration to a theoretical amount of 39.6%, 32.8 kg (0.87 K-moles) of hydrogen chloride are introduced and, in order to achieve a quantitative conversion of the components, the mixture is heated for another 5 hours to 120° C; the vessel being closed.

On dilution with water, a sample of this mixture yields a practically transparent solution having an atomic ratio of Al:Cl = 0.33:1. The chloride concentration is 300 mg of Cl⁻/g of $AlCl_3·6H_2O$ suspension.

372.4 kg (4.74 K-moles) of aluminum hydroxide of the same quality are now introduced with agitation into the suspension so obtained. The whole is heated to 120° C, and the reaction mixture becoming gradually more viscous is agitated at this temperature until a sample diluted with water and filtered has an atomic ratio of Al:Cl of 0.8:1, which corresponds to a basic aluminum chloride of the formula $Al_1(OH)_{1.75}Cl_{1.25}$, obtained after a reaction period of about 50 hours.

The content of the vessel (about 1.100 kg = about 600 l) is now diluted with 1000 l of water. By centrifugation, 166.5 kg of non-converted coarse grained aluminum hydroxide are separated which may be reused in the subsequent batch for the preparation of the $AlCl_3·6H_2O$ suspension.

Yield: 1910 kg of aqueous solution, which are further processed by electrolysis between aluminum plates to form a polybasic aluminum chloride of the formula $Al_2(OH)_5Cl$.

EXAMPLES 4 to 10

The following Tables, where the reaction conditions and the results of Examples 1 to 3 are listed again as well as data for the further Examples 4 to 10, the tests of which being carried out according to the indications given in Examples 1 to 3 using the same aluminum hydroxide, clearly show that the speed of the reaction of the $AlCl_3·6H_2O$ suspension with aluminum hydroxide depends on the chloride concentration of this suspension. The reverse reaction speed, that is, the hydrolytic decomposition of basic aluminum chlorides formed into HCl and finest-grained aluminum hydroxide decreases with increasing chloride concentration. In case of low chloride concentration, there are always obtained reaction mixtures containing finest-grained aluminum hydroxide having a grain diameter of from about 3 to 5 μ besides basic aluminum chloride and non-converted aluminum hydroxide, which considerably complicates the work-up, that is, the separation of the aqueous solutions of the basic aluminum chloride.

Because of the relation between the mass of the total hydrogen chloride used ($M_{HCl}$), the mass of the $AlCl_3·6H_2O$ suspension ($M_S$) and the theoretical HCl concentration of the hydrochloric acid ($C_{HCl}$), the Cl concentration of the $AlCl_3·6H_2O$ suspension may be calculated on the predetermined concentration of hydrochloric acid alone and compared with the analysis data in order to control the batch.

Equation:

$$\frac{M_{Cl}}{M_S} = 0.972 \cdot \frac{M_{HCl}}{M_S} = 0.972 \cdot \frac{C_{HCl}}{1 + 0.706 \cdot C_{HCl}} \quad \left(\frac{\text{g chloride}}{\text{g suspension}}\right)$$

$C_{HCl}$ has to be calculated in weight % divided by 100
The factor 0.706 is calculated on 100 % $Al(OH)_3$.
$M_{Cl}$ = mass of the chloride.

TABLE I

Preparation of the $AlCl_3$-hexahydrate suspension
Atomic ratio Al:Cl = 0.33:1

| Ex. No. | Amount of hydrochloric acid weight % | HCl gas additionally | theoretical hydrochloric acid concentration in weight % of HCl | total hydrogen chloride | Aluminum hydroxide (65 % of $Al_2O_3$) amount = moles | mg chloride/ g $AlCl_3·6H_2O$- suspension (measured) |
|---|---|---|---|---|---|---|
| 1 | 1014 g 36 | 123 g | 42.9 | 488 g = 13.3 moles | 350 g = 4.5 moles | 319 |
| 2 | 1014 g 30 | — | 30 | 304 g = 8.34 moles | 218 g = 2.78 moles | 240 |
| 3 | 528.8 kg 36 | 31.8 kg | 39.6 | 222 kg = 6.09 K-moles | 159 kg = 2.03 K-moles | 300 |
| 4 | 1014 g 10 | — | 10 | 101 g = 2.78 moles | 73 g = 0.94 moles | 91 |
| 5 | 1014 g | — | 20 | 202 g = | 146 g = | 169 |

TABLE I-continued

Preparation of the AlCl₃-hexahydrate suspension
Atomic ratio Al:Cl = 0.33:1

| Ex. No. | Amount of hydrochloric acid weight % | HCl gas additionally | theoretical hydrochloric acid concentration in weight % of HCl | total hydrogen chloride | Aluminum hydroxide (65 % of $Al_2O_3$) amount = moles | mg chloride/ g $AlCl_3 \cdot 6H_2O$- suspension (measured) |
|---|---|---|---|---|---|---|
| 6 | 1014 g  20  36 | — | 36 | 5.56 moles 365 g = 10.0 moles | 1.88 moles 262 g = 3.34 moles | 278 |
| 7 | 1014 g  36 | 20 g | 37.2 | 385 g = 10.56 moles | 276 g = 3.54 moles | 285 |
| 8 | 1014 g  36 | 40 g | 38.4 | 405 g = 11.11 moles | 291 g = 3.70 moles | 293 |
| 9 | 1014 g  36 | 86 g | 41.0 | 451 g = 12.3 moles | 324 g = 4.15 moles | 308 |
| 10 | 52.9 kg  36 | 7.5 kg | 43.9 | 26.54 kg = 0.725 K-Moles | 19 kg = 0.245 K-Moles | 324 |

TABLE II

Reaction of the suspension (Table I) with aluminum hydroxide

| Ex. No. | addition of aluminum hydroxide (65% of $Al_2O_3$) amount=moles | reaction temp.°C/ reaction time in hours | atomic ratio of Al:Cl in basic aluminum chloride obtained | % excess of $Al(OH)_3$ calc. from atomic ratio of Al:Cl obtained | Al-oxide finest grain amount in reaction mixture diluted with water |
|---|---|---|---|---|---|
| 1 | 717 g = 9.15 moles | 120/40 | 0.85 : 1 | 26 | none |
| 2 | 509 g = 6.49 moles | 120/40 | 0.59 : 1 | 39 | considerable |
| 3 | 372 kg = 4.74 K-moles | 120/50 | 0.80 : 1 | 67 | none |
| 4 | 170 g = 2.2 moles | 105/64 | 0.42 : 1 | 90 | small |
| 5 | 340 g = 4.4 moles | 105/64 | 0.44 : 1 | 88 | small |
| 6 | 611 g = 7.78 moles | 120/55 | 0.70 : 1 | 53 | traces |
| 7 | 644 g = 8.20 moles | 120/50 | 0.74 : 1 | 48 | traces |
| 8 | 679 g = 8.66 moles | 120/50 | 0.77 : 1 | 44 | none |
| 9 | 755 g = 9.6 moles | 120/45 | 0.82 : 1 | 38 | none |
| 10 | 50 kg = 0.64 K-moles | 130/10 | 0.75 : 1 | 53 | traces |

What is claimed is:

1. A process for the preparation of aqueous solutions of basic aluminum chlorides of the formula $Al_2(OH)_nCl_z$, where $0<n<4$ and $6>z>2$, $n + z$ being always 6, by reaction of hydrochloric acid with an aluminum hydroxide, which comprises preparing in a first step at a temperature of from 80° to 120° C an $AlCl_3 \cdot 6 H_2O$ suspension having a concentration in the range of from 278 to 385 milligrams of chloride per gram suspension, from 36 – 55 weight % hydrochloric acid and the equimolar amount of an aluminum hydroxide or hydrated aluminum oxide of such a kind which is soluble in hydrochloric acid only at a temperature above 80° C until a sample of the reaction mixture upon dilution with water gives a clear solution, subsequently reacting this $AlCl_3 \cdot 6 H_2O$ suspension in a second step at a temperature of from 100° to 150° C with an excess of the same aluminum hydroxide or hydrated aluminum oxide until the required stoichiometric composition is formed, whereupon the reaction mixture is stirred with the 1 – 5-fold volume of cold water in order to precipitate the excess of aluminum hydroxide and separating the non-converted aluminum hydroxide.

2. A process as claimed in claim 1, wherein the excess of aluminum hydroxide to be reacted with the $AlCl_3 \cdot 6H_2O$ suspensions amounts to 5 to 50 weight % of the quantity necessary for obtaining the desired basic aluminum chloride.

3. A process as claimed in claim 1, wherein the $AlCl_3 \cdot 6 H_2O$ suspension is reacted with the aluminum hydroxide or hydrated aluminum oxide at a temperature of from 110° to 150° C.

4. A process as claimed in claim 1, wherein the basic aluminum chloride solutions obtained are processed by electrolysis between aluminum plates in order to obtain polybasic aluminum chlorides.

5. The process of claim 1, wherein the aluminum hydroxide or hydrated aluminum oxide to be reacted in both the reaction steps is aluminum oxide bayer, bayerite, gibbsite, hydrargillite, diaspore, boehmite or bauxite.

* * * * *